United States Patent [19]
Jones

[11] Patent Number: 5,763,858
[45] Date of Patent: Jun. 9, 1998

[54] AUTOMATICALLY CONTROLLED ICE AND SNOW MELTING SYSTEM INCLUDING A TWO-WIRE REMOTE CONTROL

[76] Inventor: Thaddeus M. Jones, 19451 Quinn Rd., Bremen, Ind. 46506

[21] Appl. No.: 725,570

[22] Filed: Oct. 3, 1996

[51] Int. Cl.⁶ .................................................. H05B 1/02
[52] U.S. Cl. .................. 219/506; 219/213; 219/497; 219/544; 374/133; 340/870.17
[58] Field of Search .......................... 219/506, 535, 219/497, 492, 501, 505, 528, 213, 544; 307/38–41; 374/134, 133; 340/870.1, 870, 870.17

[56] References Cited

U.S. PATENT DOCUMENTS

| | | | |
|---|---|---|---|
| 3,716,076 | 2/1973 | Franzmeier | 138/32 |
| 3,906,242 | 9/1975 | Stevenson | 307/38 |
| 4,135,221 | 1/1979 | Genrikh et al. | 361/1 |
| 4,520,417 | 5/1985 | Frank | 361/45 |
| 4,859,834 | 8/1989 | Hausler et al. | 219/497 |
| 5,140,135 | 8/1992 | Freeman | 219/497 |
| 5,591,365 | 1/1997 | Shields | 219/213 |

Primary Examiner—Mark H. Paschall
Attorney, Agent, or Firm—Taylor & Associates, P.C.

[57] ABSTRACT

The invention is directed to an ice and snow melting system including at least one sensor for sensing a temperature or moisture associated with an ambient environment, and a heater for melting the ice and snow. An automatic controller is connected to each of the heater and the sensor. The controller selectively controls operation of the heater, and includes a remote control interface which is either integral or connected therewith. A remote control is connected to the remote control interface of the controller via two conductors. The remote control is configured to receive a signal from and transmit a signal to the controller. The received signal is indicative of a status indicator associated with the heater and/or controller, and the transmitted signal is used by the controller for the controlled operation of the heater.

19 Claims, 4 Drawing Sheets

AUTOMATICALLY CONTROLLED ICE AND SNOW MELTING SYSTEM INCLUDING A TWO-WIRE REMOTE CONTROL

BACKGROUND OF THE INVENTION

1. Field of the Invention

The present invention relates to a device for automatically controlling electric heaters used for melting and thus removing ice and snow from pavement, roofs, gutters, down spouts, etc.

2. Description of the Related Art

Snow and ice melting systems commonly employ automatic controls that operate heaters only while required, thus minimizing energy consumption and operating costs. Typically, these controls include both ambient moisture and temperature sensors. Heaters operate at ambient temperatures below a threshold, usually approximately 38° F., while ambient moisture is present and for a period of time thereafter to clear accumulated snow and ice. Operating the heaters after precipitation ceases clears any snow and ice that may have accumulated while the system was warming to the melting temperature range. Optionally, the automatic control may inhibit heater operation at temperatures too low for effective melting, e.g., below 17° F.

The ambient temperature and moisture sensors are located outdoors. They are embedded in or located near the pavement or near a structure being deiced. Both the ambient temperature and moisture sensor may be combined in a single housing with or without support electronics. Alternatively, they may be configured as separate sensors with or without the inclusion of support electronics.

Deicing heater power varies from a few to many kilowatts depending upon the size of the installation. Typically, the automatic snow melting control switches heater loads of up to 40 amperes, or so, at up to 480 volts. The automatic control is located in close proximity to either electric service or the deicing heaters. These locations are seldom convenient to operating personnel. The two-wire, non-polar U.S. National Electrical Code Class 2 compliant electrical configuration simplifies and reduces the cost of the installation.

From the middle 1980's through the early 1990's, Environmental Technology, Inc. of South Bend, Ind. 46601 sold a Heater Cycle Switch that simulated the signal from their CIT-1 Combined Snow and Ice sensor. Operating this remotely mounted switch simulated a snow signal, thus causing the automatic snow and ice melting control, e.g., a model APS-3, APS-3A, EUR-3 or EUR-4 (also sold by Environmental Technology, Inc.), to operate the heaters for a preset period of time up to five hours. The Heater Cycle Switch did not provide either status indication or a time interval adjustment. Moreover, the heater cycle switch needed to be depressed for a time period of at least five seconds for the automatic control to recognize that a manual override had occurred. No indication was provided to the user at the remote control that the automatic control had recognized the switch activation or that the heaters had been activated.

SUMMARY OF THE INVENTION

The present invention integrates a two-wire analog remote control into an automatic snow melting controller. The remote control gives operating personnel the ability to monitor snow melting system operation from a convenient location or to cycle heaters for an adjustable timer interval when necessary to clear tracked or drifted snow.

The present invention automatically controls snow and ice melting heaters while providing a two-wire analog remote control which includes status indication at a location convenient to operating personnel. The automatic snow and ice melting control recognizes the presence of the remote control. If present, the automatic control changes its mode of operation to prevent conflicts and ambiguities that might otherwise occur if operating personnel attempted to simultaneously control the snow and ice melting system both locally and remotely. The remote control is relatively simple, low cost, easy to operate and inexpensive to install.

The invention comprises, in one form thereof, an ice and snow melting system including at least one sensor for sensing a temperature or moisture associated with an ambient environment, and a heater for melting the ice and snow. An automatic controller is connected to each of the heater and the sensor. The controller selectively controls operation of the heater, and includes a remote control interface which is either integral or connected therewith. A remote control is connected to the remote control interface of the controller via two conductors. The remote control is configured to receive a signal from and transmit a signal to the controller. The received signal is indicative of a status indicator associated with the heater and/or controller, and the transmitted signal is used by the controller for the controlled operation of the heater.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
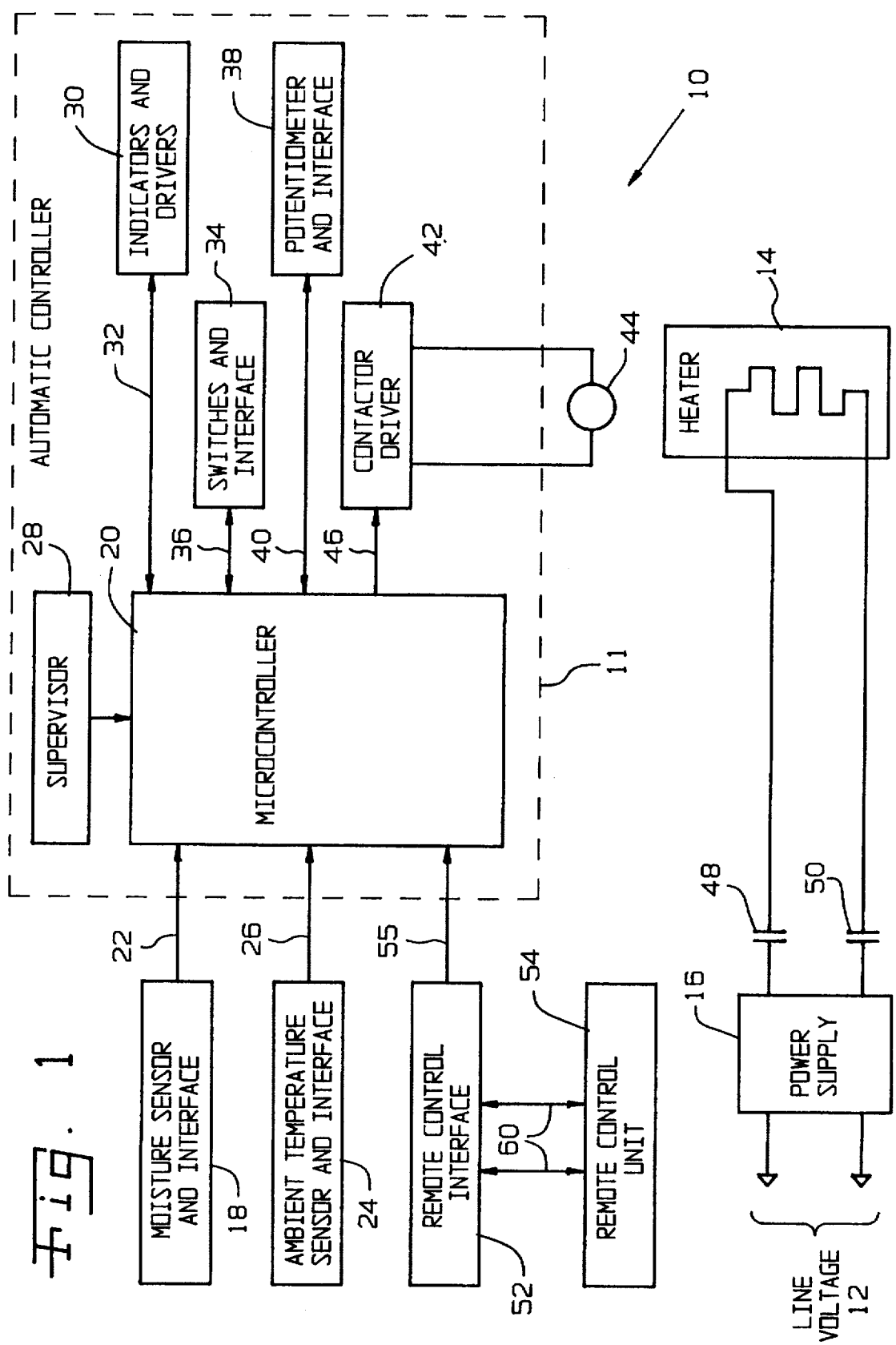
FIG. 1 is a schematic illustration of an embodiment of the overall snow and ice melting system of the present invention, showing each of the subsystems and their interconnections.

Referring now to the drawings, a remotely controlled snow and ice melting system 10 of the present invention will be described hereinafter. For illustration purposes, the remotely controlled snow and ice melting system 10 will be described with reference to two different embodiments. The automatic controller used in both embodiments is substantially identical. However, the implementation of the remote control and remote control interface for each embodiment differs as will be apparent from the following description.

Unless otherwise noted, details familiar to persons skilled in the electronic arts will be omitted since they are extraneous detail and thus have no bearing on reducing the invention to practice. Where in this application the terms "control", "controlling" or the like are used, it is to be understood that such terms may include the meaning of the terms "regulate", "regulating", etc. That is, such "control" may or may not include a feedback loop. Moreover, it is also to be understood, and it will be appreciated by those skilled in the art, that the methodology and logic of the present invention described herein may be carried out using any number of structural configurations such as electronic hardware, software, and/or firmware, or the like.

Referring to FIG. 1, line voltage 12 supplies power to system 10 including heaters 14. Power supply 16 derives its power from the line voltage 12 and supplies all circuits with appropriate AC and DC operating voltages.

Automatic controller 11, in the embodiment shown, is constructed as an integral unit which includes a number of separate subsystems or modules. In the particular embodiment shown in FIG. 1, controller 11 includes an electrical processor or microcontroller 20, a supervisor 28, indicators and drivers 30, switches and interface 34, potentiometer and interface 38, and contactor driver 42. Such modules or subsystems are preferably incorporated into a single housing, shown schematically by the dashed line representing controller 11 in FIG. 1. However, it will also be appreciated that any of the individual subsystems or modules making up automatic controller 11 may also be separate or remotely located from automatic controller 11, if desirable for a particular application.

The moisture sensor and interface 18 uses an on-board temperature regulated heater to convert snow and/or ice to liquid water. Water on the surface of a sensing grid is detected as a change in conductivity. An interface circuit incorporated within moisture sensor and interface 18 converts the conductivity change into a low-impedance analog signal which is transmitted to an electrical processor such as a microcontroller 20 via conductor 22.

The ambient temperature sensor and interface 24 converts the ambient temperature sensor signal into an analog signal which is appropriate for inputting to the microcontroller 20 via a conductor 26.

In the embodiment of ice and snow melting system 10 shown in the drawings, moisture sensor and interface 18 and ambient temperature sensor and interface 24 are shown as separate subsystems. However, it is also possible to combine moisture sensor and interface 18 and ambient temperature sensor and interface 24 into a single subsystem. An example of a single sensor which may combine the moisture sensing and ambient temperature sensing into a single unit is known, e.g., from a model CIT-1 Snow Sensor and a model GIT-1 Gutter Ice Sensor, each of which are manufactured by Environmental Technology, Inc., South Bend, Ind.

The supervisor 28 controls the restarting of microcontroller 20 upon the initial application of power and under brown-out conditions. Supervisor 28 holds the microcontroller 20 in its reset condition so long as its supply voltage is too low to permit reliable operation. Supervisor 28 asserts reset until the supply voltage has been reliable long enough for the microcontroller 20 to initialize itself.

The microcontroller 20 in combination with its firmware form the primary subsystem of snow and ice melting system 10. Microcontroller 20 provides one time programmable program memory, data memory, program alterable permanent memory (i.e., electrically erasable read only memory (EEROM), an 8-bit analog to digital (A/D) converter, timers, counter, a fail-safe (i.e., watch dog) timer and digital inputs and outputs. If the fail-safe timer is not reset frequently enough, it restarts the microcontroller 20. This prevents microcontroller 20 from latching due to electrical transients from lighting and similar causes. An example of a microcontroller which has been found suitable for use within automatic controller 11 is a PIC16C84 manufactured by Microchip Corporation, Chandler, Ariz.

The indicators and drivers 30 provide status information for operating personnel. Typical status information includes but is not limited to the presence of electric power, snow, and operation of heater 14. In the particular embodiment shown, the indicators are visible light emitting diodes (LED's), and the associated drivers consist of bipolar or metal oxide field effect transistors used as saturating power amplifiers for the low power microcontroller 20 outputs received over conductor(s) 32. However, some microcontrollers have sufficient current capacity to drive the LED's directly.

The switches and interface 34 provides an interface between operating personnel and the automatic snow and ice melting control. Switches and interface 34 is connected to microcontroller 20 via conductors 36. Switch functions include but are not limited to test/reset of the ground fault circuit interrupter (GFCI), testing of heater 14, cycle heater 14 and abort heater operation. Typically, the interface consists of a pull-up resistor for each active switch contact.

The potentiometer and interface 38 converts a potentiomer shaft azimuth into a proportional analog signal for input via conductor(s) 40 to an analog to digital (A/D) converter associated with microcontroller 20. Since the particular microcontroller 20 described with reference to FIG. 1 includes an A/D converter, interface circuitry is not required. Counter-clockwise potentiometer terminals are grounded and clockwise terminals are connected to the A/D converter reference voltage—typically the positive supply voltage for microcontroller 20. The potentiometer's wiper is connected directly to an A/D converter input. If the microcontroller used does not provide the analog to digital converter function, the potentiometer shaft position can be directly inputted to a digital input through the use of a resistor-capacitor network and a digital output using techniques well known to persons skilled in the electronic arts.

Depending upon the application, it may take several hours for the system to heat to ice melting temperature, thus causing an accumulation of snow and ice. Removing the accumulation requires heater operation for a period of time after precipitation stops. Automatic controls usually provide an adjustable hold-on timer for this purpose. An analog potentiometer associated with potentiometer and interface 46 provides a calibrated hold-on time adjustment.

The contactor driver 42 is a saturated power amplifier employing either a bipolar or metal oxide field effect transistor to drive the solenoid coil of a contactor 44. Microcontroller 20 output port(s) 46, in the particular embodiment shown, lacks the voltage and current capacity to do this directly. Contactor 44 provides two normally open contacts that control power applied to the heater 14. More particularly, contactor 44 is connected via connections (not shown) to one side of respective relays including relay contacts 48 and 50. The U.S. National Electrical Code requires breaking both line leads of 208/240/480 volt circuits. Only the line side of the power line must be broken in 120/277 volt circuits.

Figure 2:
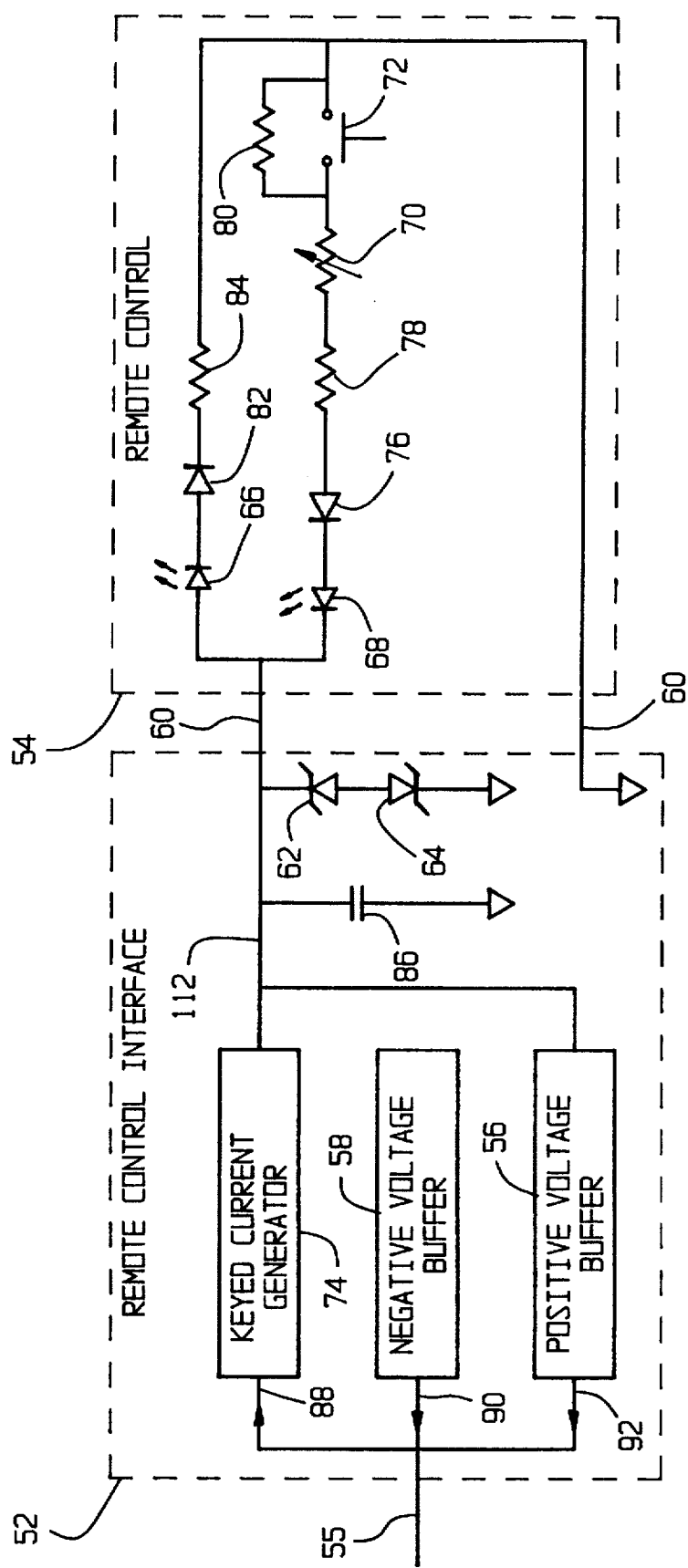
FIG. 2 is a schematic illustration of an embodiment of the remote control interface and remote control of the present invention.

FIG. 2 is a simplified schematic illustration of one embodiment of a control Remote Interface 52 and Remote Control 54 of the present invention. The Remote Control Interface 52, under command of the Microcontroller 20 via a bus or conductors 55 causes a bipolar constant current to flow through Remote Control 54. The constant current has either a positive or a negative value as determined by the Microcontroller 20. This embodiment employs currents having approximately equal magnitudes for design convenience. This need not be the case.

Based upon practical considerations, this invention operates low-level analog circuits, including the Microcontroller 20, from a single five volt supply. These circuits could operate from positive and negative supplies. Since this invention employs a single polarity power supply, it uses separate interfaces in the form of a positive voltage buffer 56 and a negative voltage buffer 58 for corresponding voltages existing at the two-wire interconnection wiring 60 to Remote Control 54. This provides improved resolution by allowing the full a–d converter range for the positive and negative voltages individually.

The series-connected equal voltage zener diodes 62 and 64 serve two purposes. The zener diodes 62 and 64 unconditionally limit the magnitude of the voltage appearing between the interconnecting wiring 60 to the zener voltage plus approximately 0.6 volts. This embodiment of the invention uses 15 volt, one watt, zener diodes 62 and 64. This provide over-voltage protection in the event that Remote Control 54 is either missing or becomes disconnected. Microcontroller 20 recognizes this condition since the zener voltages are greater than that developed by Remote Control 54 under normal operating conditions. The zener diodes 62 and 64 also absorb electrical transients coupled to interconnecting conductors 60 that might otherwise damage the electrical and electronic circuits.

Remote Control 54 for this embodiment of the invention provides two light emitting diode (LED) indicators: one LED 66 indicates the presence of electrical power (i.e., snow and ice melting system 10 is ready to operate upon detecting icing conditions) and the other LED 68 operates while automatic controller 11 operates deicing heaters 14. The rheostat-connected potentiometer 70 provides a resistance that is linearly proportional to the heater hold-on time interval. Operating the momentary push-button switch 72 causes the deicing heaters 14 to operate for the heater hold-on time associated with potentiometer 70.

While the current from Keyed Current Generator 74 is negative, current flows through LED 68, diode 76, ranging resistor 78, rheostat-connected potentiometer 70 and through the resistor 80 unless the momentary push-button switch 72 is operated. The diode 76 prevents destructive reverse biasing of the LED 68 when the current is positive.

While the current from Keyed Current Generator 74 is positive, the positive (with respect to ground) voltage is the sum of three components: the forward biased voltage drops of LED 66 and the diode 82 and a voltage equal to the product of the positive current and the resistance of the resistor 84.

While the current from Keyed Current Generator 74 is negative, the negative (with respect to ground) voltage is the sum of four of five components depending upon whether or not the push-button switch 72 is operated. Assume that the push-button switch is operated and that negative current flows. Under these conditions, the negative voltage is the sum of four components: the forward biased voltage drops of LED 68 and the diode 76 and a voltage equal to the product of the negative current and the total resistance of the resistors 78 and 70. While negative current flows and the push-button switch 72 is not operated a fifth voltage term equal to the value of the negative current times the resistance of the resistor 80 must be added to the total.

Keyed Current Generator 74 under command from Microcontroller 20 alternately causes negative and positive currents of equal time intervals and magnitudes to flow through Remote Control 54. The negative and positive currents are switched at a rate exceeding 30 Hz. This prevents a human observer from seeing the LED's 66 and 68 flicker.

Keyed Current Generator 74 provides constant positive and negative output. Changing the load has only a minor influence upon the magnitudes of the positive and negative output currents. Thus, accidental short circuiting of interconnection wiring 60 will not damage Keyed Current Generator 74.

Assume that a positive current flows into Remote Control 54. The voltage drop across the resistor 84 is known since the current is known. Thus, the voltage drop across LED 66 and diode 82 can be determined by subtracting the calculated voltage drop across the resistor 84 from the positive output voltage appearing across the interconnection wiring 60. Microcontroller 20 determines the diode voltage drops upon the initial application of power and periodically thereafter. Knowing the current value of the diode voltage drops eliminates error caused by variation of the ambient temperature to which Remote Control 54 is exposed.

Now assume that a negative current flows into Remote Control 54. Since the value of the negative current and the voltage drop across the diodes 82 and 76 are known, the total value of the series connected resistors 78 and 70 and, optionally if the push-button switch 72 is operated, the resistor 80 can be determined.

For this embodiment of the invention to work as described the value of resistor 84 must be greater than the maximum value sum of the values of resistors 78, 70, and 80. Further, the value of resistor 80 must exceed the maximum sum of the resistors 78 and 70. This ensures that the magnitude of the positive voltage appearing on interconnection wiring 60 always exceeds the magnitude of the negative voltage under all normal operating conditions. It also permits detecting the operation of push-button switch 72.

Microcontroller 20 can detect the polarity of the connection to Remote Control 54, thus ensuring proper operation independent of the polarity of interconnection wiring 60. Further, Microcontroller 20 can detect the operation of the push-button switch 72. Operating switch 72 causes a negative voltage magnitude that is below a threshold value.

Microcontroller 20 also determines the value of the resistors 78 and 70 as follows. Assume voltage magnitudes (i.e., absolute values). First, Microcontroller 20 encodes and scales the magnitude of the negative voltage. It then subtracts the scaled value of the voltage drop across light emitting diode 68 and diode 76 from the result. Thereafter, it calculates the total resistance by dividing the previous value by the magnitude of negative current. If the result exceeds a threshold value, push-button switch 72 is not being operated and the value of resistor 80 is subtracted from the sum. If the previous result is at or below a threshold value, the value of the resistor 80 is not subtracted from the sum. Thus, the calculated resistance value is equal to the sum of the values of the resistors 78 and 70. To determine the value of the rheostat-connected potentiometer, Microcontroller 20 subtracts the value of resistor 78 from the sum. A look-up table is used to convert the rheostat connected potentiometer value into a deicing heater hold-on time setting.

Resistor 78 limits transient currents induced in interconnection wiring 60 to a safe value in the event that push-button switch 72 is operated while the rheostat-connected potentiometer is set at a minimum value (i.e., zero ohms). This protects light emitting diode 68. For positive transients, resistor 84 performs this task as a secondary function.

A capacitor 86 limits the time rate of change of the voltage applied to interconnection wiring 60 to a value small enough to prevent electromagnetic interference above frequencies of one (1) kilohertz. This permits meeting the conditions for meeting both the standards for FCC type acceptance necessary for domestic sales and the CE mark required by the European Common Market countries.

Bus 55 connecting Microcontroller 20 with Remote Control 54 includes three conductors 88, 90 and 92. Conductor 88 connects Keyed Current Generator 74 to an output port of Microcontroller 20. A binary signal is provided over conductor 88 which commands Keyed Current Generator 74 to provide either a positive or negative constant current to Remote Control 54. Conductors 90 and 92 convey the analog signals from outputs of the Negative Voltage Buffer 58 and Positive Voltage Buffer 56 to Microcontroller 20 a-d converter inputs.

Negative Voltage Buffer 58 converts a negative input voltage into a scaled positive output voltage for connection to a Microcontroller 20 a-d converter input. Its gain is approximately minus one-third in this embodiment of the invention. Positive Voltage Buffer 56 performs the same reciprocal function for positive inputs. Its gain is approximately one-third in this embodiment of the invention. Each of Negative Voltage Buffer 58 and Positive Voltage Buffer 56 have very high input impedances and provide low pass filtering to reduce noise.

Figure 3:
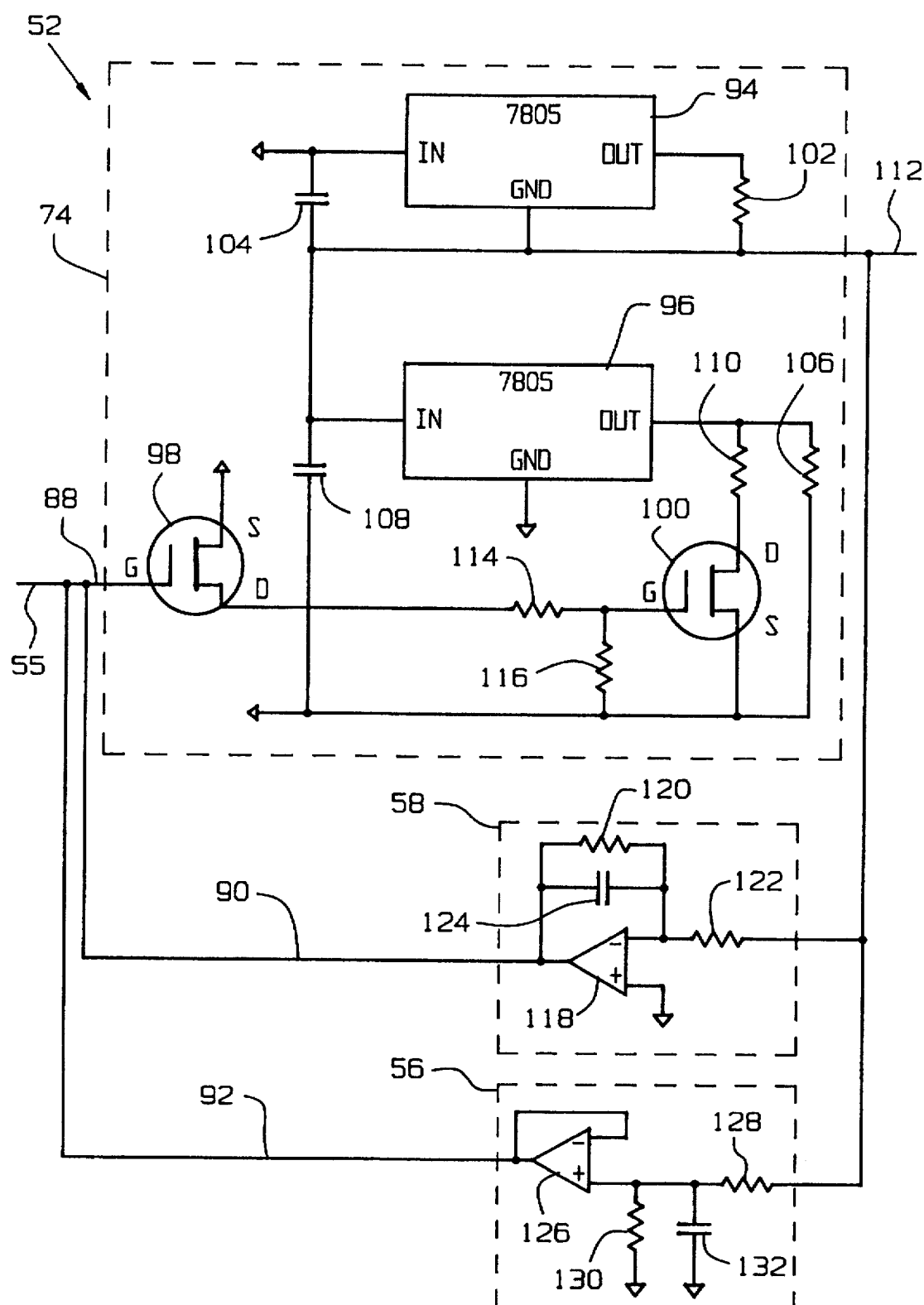
FIG. 3 is a more detailed schematic illustration of the remote control interface shown in FIG. 2.

Referring now to FIG. 3, Keyed Current Generator 74, Positive Voltage Buffer 56 and Negative Voltage Buffer 58 are shown in greater detail. Keyed Current Generator 74 includes two, three-terminal voltage regulators 94 and 96 of the industry standard 7805 type, or their functional equivalent, a p-channel metal oxide field effect transistor (PMOSFET) 98 and an n-channel metal oxide field effect transistor (NMOSFET) 100.

Regulator 94 produces a positive current. That is, it sources current. Since regulator 94 is in the form of a 7805 voltage regulator in the embodiment shown, the output current equals 5 volts divided by the value of resistor 102 plus 4 milliamperes. Capacitor 104 suppresses any tendency for regulator 94 to oscillate at high frequencies.

Conversely, regulator 96 produces a negative current. That is, it sinks current. Since regulator 96 is in the form of a 7805 voltage regulator, the output current equals 5 volts divided by the value of resistor 106 plus 4 milliamperes when the n-channel field effect transistor (NMOSFET) 100 is not conducting. Normally this current is set to a value of approximately 10 milliamperes. This ensures that regulator 96 operates and regulates properly under minimum current conditions. Capacitor 108 ensures high frequency stability. With NMOSFET 100 conducting, the output current equals 5 volts divided by the parallel combination of resistors 106 and 110. Under this condition, the negative current source is set to sink twice the current that the positive current regulator sources. The positive and negative current sources are paralleled. Thus, the net output current is the difference between the positive and negative current sources. The net output current flows to ground through the conductor 112 which becomes one of the pairs of interconnection wiring 60 that is connected to Remote Control 54 (see FIG. 2.). The component values are chosen to provide two mutually exclusive current levels of equal and opposite value.

Conductor 88 forming part of bus 55 is connected to an output post of Microcontroller 20. When this port is at its high value, approximately five volts, the PMOSFET 98 is off thus blocking current flow through the voltage divider including resistors 114 and 116. Under this condition, NMOSFET transistor 100 is off thus preventing current flow through resistor 110. This causes the negative current source to sink its minimum current thus causing a net positive current to flow to Remote Control 54.

When the output port of Microcontroller 20 connected to conductor 88 is at its low value, i.e., approximately zero volts, PMOSFET 98 saturates, thus causing current flow through the voltage divider including resistors 114 and 116. The voltage divider prevents exceeding the maximum gate-to-source voltage of NMOSFET 100. This causes NMOSFET 100 to saturate thus causing current to flow through resistor 110. Now, the negative current source sinks it maximum current thus causing a net negative current to flow to Remote Control 54.

When Keyed Current Generator 74 produces a negative current, Remote Control 54 responds with a negative voltage. Since all analog circuits along with Microcontroller 20 operate from a single five volt supply, a negative voltage supplied by Remote Control 54 must be inverted and scaled before inputting to an a-d converter input of Microcontroller 20 via conductor 90 which forms a part of bus 55. These tasks are accomplished by Negative Voltage Buffer 58.

Operational amplifier 118 of Negative Voltage Buffer 58 is configured as an inverting amplifier. Since its inverting input is a "virtual earth", a negative voltage from Remote Control 54 does not reverse bias the operational amplifier 118 negative input, thus ensuring normal operation. The ratio of resistors 120 and 122 determines the value of the inverting voltage gain. This value is set at a value permitting all values of a negative voltage from Remote Control 54 to be mapped into a range of the a-d converter input of Microcontroller 20. Capacitor 124 limits the bandwidth of Negative Voltage Buffer 58 to limit the effects of electronic noise. The value of resistor 122 is chosen so that the current flowing does not exceed 0.1% of the value of the negative current from Keyed Current Generator 74. This prevents loading Keyed Current Generator 74 which would reduce accuracy.

When Keyed Current Generator 74 produces a positive current, Remote Control 54 responds with a positive voltage. Positive Voltage Buffer 56 scales positive voltages supplied from Remote Control 54 to values within the range of an a-d converter of Microcontroller 20. Positive Voltage Buffer 56 communicates its signal to the Microcontroller 20 a-d converter input via the conductor 92 which forms part of bus 55.

Operational amplifier 126 is configured as a unity gain voltage follower. Resistors 128 and 130 scale positive voltages from Remote Control 54 to values within the range of an a-d converter input of Microcontroller 20. Capacitor 132 in conjunction with resistors 128 and 130 comprise a low pass filter that removes electronic noise from positive signals. The sum of the values of resistors 128 and 130 must be such that the current flow does not exceed 0.1% of the maximum current supplied by Keyed Current Generator 74, thus preserving accuracy. Resistor 128 in conjunction with the parasitic diode junction between the operational positive input and the negative operational amplifier 126 supply voltage, which is ground, prevents reverse bias damage when Remote Control 54 produces negative voltages. The value of resistor 128 must be large enough to limit the reverse bias current to a safe value under these conditions.

Figure 4:
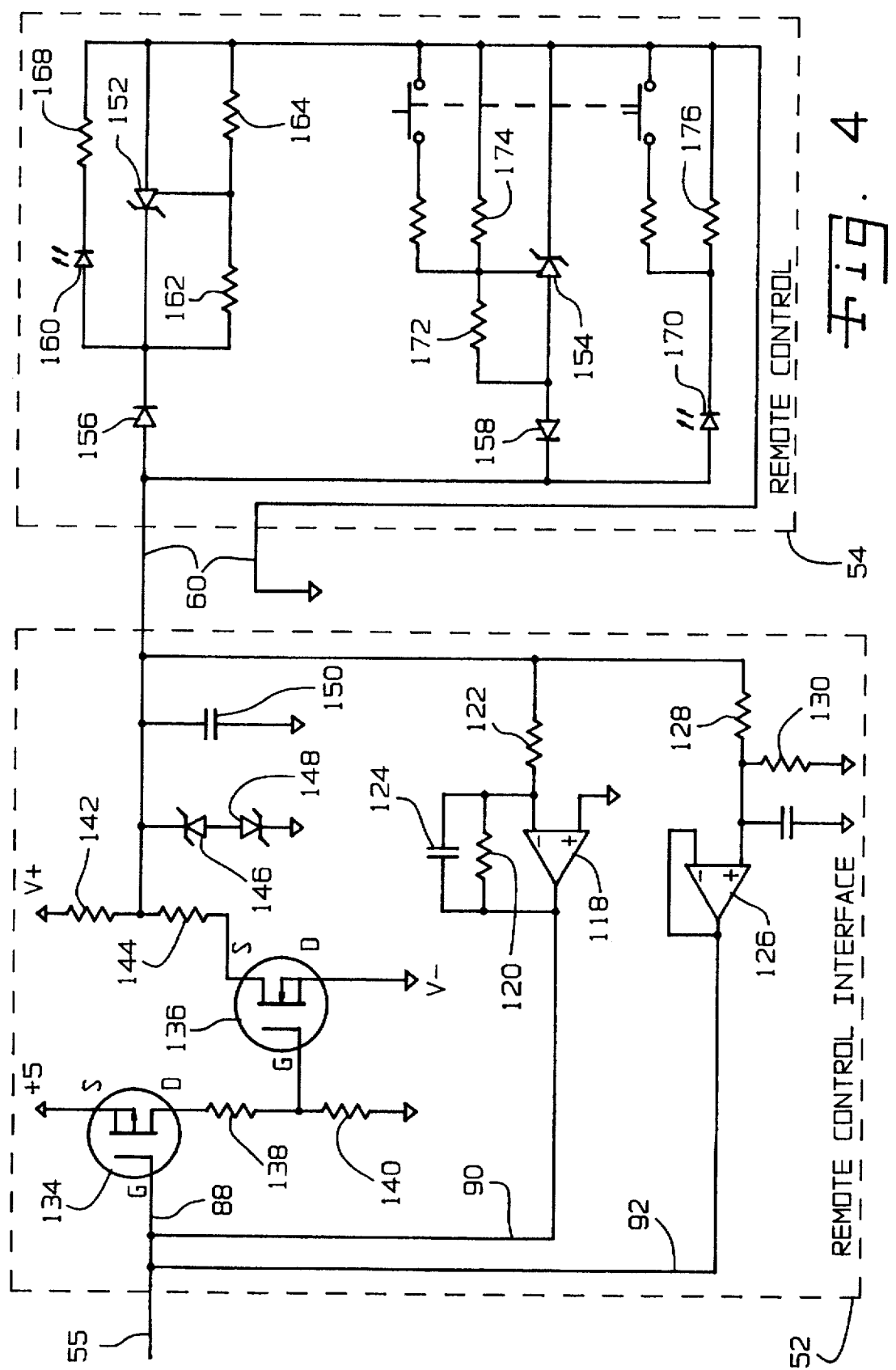
FIG. 4 is a schematic illustration of another embodiment of a remote control interface and remote control of the present invention.

FIG. 4 is a schematic illustration of another embodiment of the Remote Control Interface 52 and Remote Control 54 shown in FIG. 1. Remote Control Interface 52 provides positive and negative current for exciting the Remote Control 54. It also conditions the positive and negative voltage responses from Remote Control 54 for application to Microcontroller 20 a–d converter inputs.

Similar to the embodiment shown in FIGS. 2 and 3, bus 55 includes three conductors 88, 90 and 92 which connect Remote Control Interface 52 to Microcontroller 20. Conductor 88 controls the polarity of the current applied to Remote Control 54. A low logic level produces a positive current and a high logic level produces a negative current. Conductor 90 is connected to a Microcontroller 20 a–d converter input. It carries a scaled analog voltage proportional to a negative voltage developed by Remote Control 54. Conductor 92 is connected to a Microcontroller 20 a–d converter input. It carries a scaled analog voltage proportional to a positive voltage developed by Remote Control 54. The interconnection wiring pair 60 connects Remote Control Interface 52 with Remote Control 54.

Remote Control Interface 52 includes a PMOSFET transistor 134 and an NMOSFET transistor 136 which each act as saturated switches. The gate of PMOSFET transistor 134 is connected to an output port of Microcontroller 20 via conductor 88 forming part of bus 55. When the output port of Microcontroller 20 is at its zero logic level, the enhancement mode of PMOSFET transistor 134 saturates. When this happens, the series-connected resistors 138 and 140 are connected between +5 volts and V–. The values of resistors 138 and 140 are chosen such that the gate-to-source voltage of the enhancement mode NMOSFET transistor 136 is sufficient to cause saturation without exceeding its maximum rating.

Saturating the NMOSFET transistor 136 connects the series-connected resistors 142 and 144 between the V+ and V– power supply voltages. The relative values of resistors 142 and 144 and the power supply voltages must be such that net negative current of sufficient magnitude flows to Remote Control 54. Their power rating must be sufficient to prevent damage due to overheating should the conductors of interconnection wiring 60 be accidently shorted together.

When an output port of Microcontroller 20 which is connected to bus 55 and thence the gate of PMOSFET transistor 134 through conductor 88 assumes a logical zero value, neither the PMOSFET transistor 134 nor the NMOSFET transistor 136 conduct. Under this condition, Remote Control 54 is connected to the V+ supply voltage through resistor 142 and a positive current flows. The back-to-back connected zener diodes 146 and 148 limit the voltage supplied to interconnection wiring 60 in the event that Remote Control 54 is missing or becomes accidently disconnected. A capacitor 150 limits the rate-of-change of the current transitions thus preventing radio frequency interference.

Remote Control 54 utilizes two LM431 programmable zener diodes 152 and 154 manufactured by National Semiconductor. The cathode-to-anode voltage is determined by a pair of resistors connected as a voltage divider. The cathode-to-anode voltage is applied to the input of the voltage divider. The voltage divider output is connected to the programmable zener diode control input.

A diode 156 protects programmable zener diode 152 from destructive reverse bias that would otherwise occur during negative current conditions. During positive current flow, diode 156 is forward biased. This enables the operation of programmable zener diode 152 and light emitting diode 160. A voltage divider including resistors 162 and 164 sets the voltage produced by programmable zener diode 152. Under conditions of positive current flow, the output voltage produced by Remote Control 54 equals the voltage produced by programmable zener diode 152 plus a 0.7 volt voltage drop of diode 156. A resistor 168 sets the bias current for light emitting diode 160.

A diode 158 protects programmable zener diode 154 from destructive reverse bias under positive current conditions. During negative current flow, diode 158 is forward biased. This enables the operation of programmable zener diode 154 and light emitting diode 170. A voltage divider including resistors 172 and 174 sets the voltage produced by programmable zener diode 154. Under conditions of negative current flow, the output voltage produced by Remote Control 54 equals the voltage produced by programmable zener diode 154 plus the 0.7 volt voltage drop of diode 158. A resistor 176 sets the bias current for light emitting diode 170.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ice and snow melting system, comprising:
   at least one sensor, each said sensor being configured for sensing at least one of temperature and moisture associated with an ambient environment;
   a heater for melting the ice and snow;
   an automatic controller connected to each of said heater and said at least one sensor, said controller selectively controlling operation of said heater, said controller including a remote control interface; and
   a remote control connected to said remote control interface via only two conductors, said remote control independently controlling operation of said heater through said connection with said remote control interface, said remote control being configured to receive a signal from and transmit a signal to said controller over at least one of said two conductors, said received signal being indicative of a status indicator associated with at least one of said heater and said controller, said transmitted signal being used by said controller for said controlled operation of said heater.

2. The ice and snow melting system of claim 1, wherein said status indicator corresponds to electrical power which is applied to at least one of said heater and said controller.

3. The ice and snow melting system of claim 1, wherein said controlled operation of said heater comprises one of applying power to and removing power from said heater for a predetermined period of time.

4. The ice and snow melting system of claim 1, wherein said controller includes a means for determining a polarity of said connection between said remote control interface and said remote control.

5. The ice and snow melting system of claim 1, wherein said controller includes a means for detecting said connection via said two conductors between said remote control and said remote control interface.

6. The ice and snow melting system of claim 5, wherein said detecting means comprises two zener diodes connected to each other in a back-to-back series configuration, and further being connected to one of said two conductors.

7. The ice and snow melting system of claim 1, wherein said controller includes a first means for limiting a time rate of change of a voltage which is transmitted over one of said two conductors connecting said remote control and said remote control interface.

8. The ice and snow melting system of claim 7, wherein said first limiting means comprises a capacitor connected to said one conductor.

9. The ice and snow melting system of claim 8, wherein said remote control interface includes said first limiting means.

10. The ice and snow melting system of claim 1, wherein said controller includes a second means for limiting a voltage which is transmitted over one of said two conductors connecting said remote control and said remote control interface.

11. The ice and snow melting system of claim 10, wherein said second limiting means comprises two zener diodes connected to each other in a back-to-back series configuration, and further being connected to said one conductor.

12. The ice and snow melting system of claim 11, wherein said remote control interface includes said second limiting means.

13. The ice and snow melting system of claim 1, wherein said remote control further comprises at least one indicator and at least one switch, said switch manually effecting said transmitted signal from said remote control to said controller.

14. The ice and snow melting system of claim 13, wherein said at least one indicator comprises at least one light emitting diode.

15. The ice and snow melting system of claim 14, wherein said remote control further comprises a potentiometer configured as a rheostat, said rheostat being manually positioned in association with a hold-on time for said controlled operation of said heater.

16. The ice and snow melting system of claim 1, wherein said received signal and said transmitted signal each comprise an analog signal.

17. The ice and snow melting system of claim 1, wherein said remote control interface is connected to said controller via a bus.

18. The ice and snow melting system of claim 1, wherein said remote control further comprises a means for adjusting a hold-on time for said controlled operation of said heater.

19. The ice and snow melting system of claim 18, wherein said adjusting means comprises a potentiometer configured as a rheostat.

* * * * *